Aug. 6, 1935.   J. L. CREVELING   2,010,139
LUBRICATING DEVICE
Filed Sept. 17, 1931
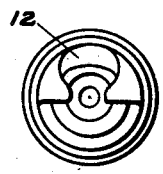
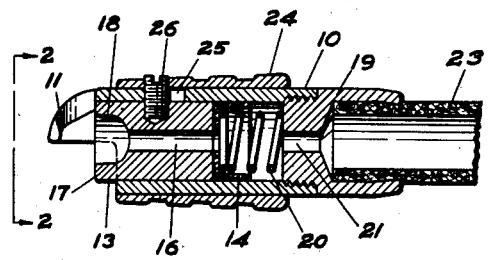
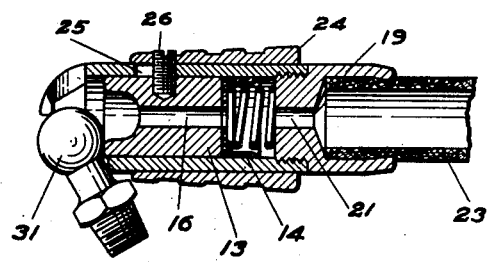
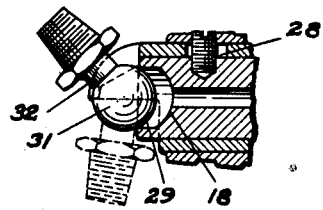
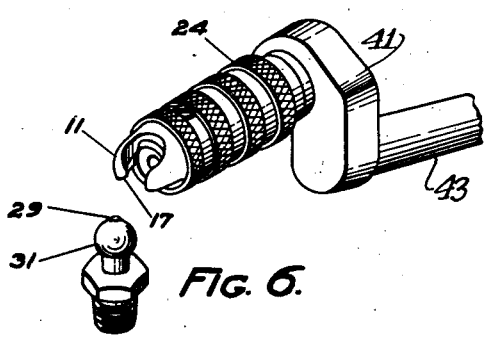
INVENTOR
JOHN L. CREVELING
BY
ATTORNEY Patented Aug. 6, 1935

2,010,139

UNITED STATES PATENT OFFICE 2,010,139

LUBRICATING DEVICE

John L. Creveling, Tucson, Ariz., assignor to The Lubrication Corporation, South Bend, Ind., a corporation of Delaware Application September 17, 1931, Serial No. 563,405

11 Claims. (Cl. 285—143)

This invention relates to couplings for fluid conduits and particularly to couplings which may be detachably connected to a plurality of similar fittings and particularly adaptable for use with lubricating devices for automotive vehicles, industrial machines, etc.

An important object of the invention is to provide a coupling which may be readily attached to a fitting for supplying fluid thereto such as lubricant, and which also may be readily detached from the fitting after it has been supplied with lubricant.

Another object of the invention is to provide a coupling which may have a universal angular relation to the fitting and be operative in a plurality of positions with reference thereto.

Another object of the invention is to provide a coupling which may be snapped into position on the fitting and be readily detached by an angular movement of the coupling beyond its normal operative position.

Another object of the invention is to provide a coupling which is adapted for use with a spherical headed fitting.

Another object of the invention is to provide a coupling which may be easily connected to the fitting and in which pressure supplied to the lubricant acts to effect or increase the clamping pressure of the coupling upon the fitting.

A feature of the invention relates to the arrangement and construction of parts, which preferably comprise a body member having a cylindrical portion and a slidable nozzle member within the cylinder, adapted to be urged into clamping relation with the fitting upon an application of pressure to the lubricant. The slidable nozzle may, if desired, be provided with a sleeve arranged externally of the body and cooperative with the nozzle portion in a manner to permit manual movement of the nozzle for attaching and detaching the coupling.

Another feature of the invention relates to the formation of the contacting faces of both the nozzle and the body portions. The nozzle portion preferably has a lubricant orifice of considerable contact area in order to be operative through a considerable range of universal movement to feed lubricant to the lubricant passage in the fitting. The body portion is preferably provided with overhanging clamp or jaw members which are adapted to engage the ball fitting and preferably has a lateral opening through which the fitting may be inserted to be clamped between the inturned yoke members and a slidable piston. If desired, the body portion may be cut away on the side normally lying adjacent the neck of the fitting, whereby the neck may engage the edge of the spring pressed nozzle or piston, and act as a fulcrum to disengage the fitting after the coupling has been moved beyond the normal operative position.

Other objects and features of the invention will be apparent from the following description of certain embodiments which I have shown in the accompanying drawing, in which:

Fig. 1 is a sectional view of a coupling constructed according to the invention;

Fig. 2 is an end view taken in the direction of arrows 2—2 of Fig. 1;

Fig. 3 is a view similar to Fig. 1, showing the piston retracted for the insertion or removal of a fitting;

Fig. 4 illustrates the coupling as installed in one angular relation with respect to a spherical fitting;

Fig. 5 is a perspective view of the coupling shown in Figs. 1 to 4, inclusive; and Fig. 6 is a perspective view of a spherical fitting with which the improved coupling may be used.

In the drawing, 10 is the body of the coupling having inwardly turned terminal members 11 which are adapted to restrain a spherical ball fitting and having a slot 12 of sufficient size to provide clearance for the neck portion of a spherical lubricant fitting. Within the cylindrical portion of body 10 is a piston 13 provided with a compression washer 14, a lubricant passageway 16, and an annular contact area 17 surrounding a lubricant space 18. The outer end of the body member 10 is closed by a threaded cap 19 and a compression spring 20 is interposed between the cap and the piston 13 for urging it toward its clamping position. Cap 19 is provided with a lubricant passageway 21 and is secured in any suitable manner to a conduit 23, as for example, a flexible hose as indicated, by means of which the passageway 21 is connected with any convenient source of lubricant, preferably supplied under pressure. Slidably mounted upon the body member 10 is a sleeve 24 secured to piston 13 by any desired means, such as a screw 26, a slot 25 being provided in the body member 10 for permitting the sleeve to move relative thereto. By reason of this construction, the operator may reciprocate the piston within the cylinder to overcome spring 20 and to release the coupling from the fitting. The annular contact 17 may be in a plane normal to the axis of the piston 13 and of a size which overlaps considerable surface area of the ball fitting. Thus preferably it is of a size which overlaps approximately one-half of the surface area of the ball. The enlarged contact area permits a wide range of universal movement between the coupling and the fitting without disturbing the operative connection between the bore 16 and the lubricant orifice 29 of the ball fitting 31.

As shown in Figs. 4 and 6, the lubricant fitting is preferably formed with the orifice 29 positioned at the top of the ball head of the fitting in alignment with a central bore through the shank thereof. With this construction the fitting can be made most easily and cheaply and yet by reason of my improved coupler, it is possible for the operator to supply lubricant thereto from widely varying angles by a coupler which forms a lubricant tight seal with the fitting. As shown in Fig. 4, it is possible for the coupler to approach the fitting from angles varying through at least 90 degrees and thus a considerable variation in angle of approach is possible. It is true, that if desired, the orifice 29 may be displaced from its position at the top of the ball head of the fitting, but as stated above, I prefer the construction shown in which the orifice is exactly in the top of the ball head, largely because of the consequent simplicity of manufacture of the fitting. Preferably the piston 13 (Fig. 1) should project beyond the cylindrical body portion 10 on its under side whereby it may be contacted with the neck portion 32 of the fitting 31 and enable the coupling to be dislodged from the fitting by a clockwise movement of the coupling relative to the fitting as shown in Fig. 3.

I provide means whereby an even greater universality of angle of approach may be attained. As shown in Fig. 5, the coupling may be provided with a goose-neck so that the annular contact area or face 17 forms a 45 degree angle with the axis of the rigid inlet conduit 43. To accomplish this desirable structure, I substitute for the cap 19 a member 41 having formed at the upper end integrally therewith a plug corresponding to the cap 19, said member 41 being formed at the opposite end with a tapped opening in which may be secured a rigid conduit 43. Thus the conduit 43 has an axis whose forward prolongation would extend approximately through the center of the contact area 17 and therefore no turning moment is caused by the push exerted by the operator. At the same time the axis of the conduit is inclined at an angle of 45 degrees to the plane of such contact area. By this arrangement the approach of the conduit 43 to the fitting may be in substantially any desired direction, and thus it is possible to approach fittings which would otherwise be in inaccessible positions. It may be seen that by inverting the coupler shown in Fig. 5 from the position shown and applying it to the fitting shown in full lines in Fig. 4, the 45 degree angle of the goose-neck will be added to the angle shown between the fitting and the piston and a variation in approach will be obtained of 90 degrees from the axis of the fitting. By the application of the coupler shown in Fig. 5 to the fitting shown in dotted lines without inverting it, the 45 degrees of the goose-neck will be added to the corresponding angle and a variation of 90 degrees to the axis of the fitting on the opposite side will be obtained. Thus the fitting may be approached from any direction included in the hemisphere above the head of the fitting, by selectively inserting the coupler either in upright or in reversed position as is most convenient.

In each of the embodiments shown, the coupling is adapted for use with a source of lubricant under pressure which forces piston 13 in the form shown toward the outer end of the coupling to clamp the ball fitting therein with a fluid tight connection. It is therefore important that the area of the pistons exposed to the pressure of the lubricant be greater than the projected area of the orifice in contact with the ball whereby the force tending to clamp the fitting is greater than the force tending to separate the piston from the ball. In the embodiment I have shown a manual release whereby the fitting may be disengaged from the coupling, but if desired, this may be omitted and the ball inserted in the opening by placing the curved surface of the ball against the exposed shoulder of the piston, and which shoulder also serves as a means for releasing the fitting by a turning movement of the coupling beyond its operative range, which causes the neck of the coupling to fulcrum on the shoulder and displace the piston to release the ball.

While I have illustrated and described one embodiment of my invention, it is understood that this showing and description are illustrative only, and that I do not regard the invention as limited to the forms shown and described, or otherwise, except by the terms of the following claims.

I claim:

1. A coupling for a lubricant conduit comprising, a body forming a cylinder, a piston therein adapted to coact with the body operatively to clamp a lubricant fitting when fluid pressure is applied to the cylinder, and means comprising a sleeve for facilitating manual movement of the piston for releasing the clamping engagement with the fitting.

2. A coupling for a lubricant conduit comprising, a body forming a cylinder, a piston therein adapted to coact with the body operatively to clamp a lubricant fitting when fluid pressure is applied to the cylinder, and manually operated means for actuating the piston, said means comprising a sleeve rigidly coupled to said piston.

3. A coupling for a lubricating device comprising, a pair of telescopic members adapted to be operated by lubricant pressure to clamp a lubricant fitting, and manually operated means for separating the members to release the fitting, said means comprising a sleeve telescoped over the pair of telescopic members.

4. A coupling for a lubricating device, comprising, a pair of telescopic members adapted to be operated by lubricant pressure to clamp a lubricant fitting, and a sleeve slidable on the outer member and secured to the inner member for separating the same to release the fitting.

5. A lubricant discharge nozzle comprising, a body portion having a cylinder, a piston therein having a passageway, said piston being adapted to be operated by fluid pressure to clamp a spherical fitting in the body portion, said piston having an annular recess providing a lubricant space bounded by a contact edge adapted to embrace substantially one-half of the surface area of the spherical fitting, and manually operable means including a hand grip, by which said nozzle may be supported in the hand of the operator, for drawing said piston inwardly of said cylinder during engagement of the body portion with a fitting to move the said contact edge of the piston beyond the adjacent face of the fitting whereby the nozzle may be withdrawn from the fitting.

6. A coupling for a lubricating device comprising, a body portion forming a cylinder, a piston therein adapted to coact with the body to clamp a fitting, said piston having a face normal to the axis of said cylinder, an elbow rigidly secured to the rear of said cylinder, and a rigid conduit rigidly connected with said elbow and arranged with its axis substantially aligned with the center of the face of said piston but out of alignment with the axis of said cylinder.

7. A coupling for a lubricating device comprising, a body portion forming a cylinder, a piston in said cylinder, said piston being responsive to lubricant pressure in said cylinder and having a passage therethrough, a cap for one end of said cylinder having a passage therethrough, a spring abutted between and normally spacing said piston and cap, a fitting engaging jaw fixed relative to said body portion and aligned with said piston whereby a lubricant receiving fitting may be clamped between the jaw and the piston when the piston is moved outwardly of the cylinder in response to lubricant pressure, and a sleeve slidable on the cylinder and connected to the piston for moving the same against said spring.

8. A coupling for a pressure lubricating device comprising, a body portion providing a cylinder and having a fitting clamping jaw at one end, a cap for the other end of said cylinder, said cap having a lubricant passage therethrough for conducting lubricant to said cylinder, a combination piston and lubricant nozzle slidably disposed in said cylinder, said piston being contiguous to said cap and said nozzle being contiguous to said clamping jaw, said piston being subject to pressure of lubricant entering said passage and providing a lubricant conduit to said nozzle, a spring interposed between said piston and cap and normally spacing them apart, and means slidable on said cylinder and secured to said nozzle for retracting said piston against the action of said spring.

9. A coupling for a lubricating device comprising, a body having a cylinder and a pair of spaced apart jaws adapted to engage opposite sides of a spherical fitting whereby to provide contact with the fitting throughout a range of substantially 180° about the center of the spherical surface of the fitting, a piston in the cylinder adapted to be forced against the fitting by fluid pressure, said piston having a lubricant discharge opening surrounded by a contact face arranged in a plane normal to the axis of the piston, said opening being bounded by a seal effecting contact edge adapted to overlap substantially one-half of the surface area of the spherical fitting.

10. A coupling for a lubricating device comprising, a lubricant discharge nozzle having a discharge orifice defined by a contact area normal to the plane of the axis of said nozzle, an elbow rigidly secured to the rear of said nozzle, and a rigid conduit rigidly connected with said elbow and arranged with its axis substantially aligned with the center of said contact area and making an acute angle with the axis of said nozzle.

11. A lubricant discharge nozzle of the clamp type comprising, a body portion having a clamping jaw and providing a cylinder, a piston in said cylinder having a passageway therethrough, said piston being adapted to be operated by the lubricant pressure of lubricant in said cylinder admitted to the nozzle to clamp a spherical head lubricant receiving fitting between the piston and said jaw, said piston having a lubricant space encompassing one end of said passageway bounded by an annular contact edge adapted to embrace substantially one-half of the spherical surface of said fitting, said jaw and said contact edge cooperating to facilitate the movement of the nozzle throughout a relatively wide angular range relative to the fitting head during the servicing operation, and manually operable means including a hand grip, by which said nozzle may be supported in the hand of the operator, for drawing said piston inwardly of said cylinder during engagement of the jaw with a fitting to move the said contact edge of the piston beyond the adjacent face of the fitting whereby the nozzle may be withdrawn from the fitting.

JOHN L. CREVELING.